United States Patent [19]

Wood

[11] 4,073,402
[45] Feb. 14, 1978

[54] PREASSEMBLED PRESSURE RELIEF APPARATUS

[75] Inventor: Loren E. Wood, Tulsa, Okla.

[73] Assignee: Black, Sivalls & Bryson, Inc., Houston, Tex.

[21] Appl. No.: 707,249

[22] Filed: July 21, 1976

[51] Int. Cl.² .............................................. F17B 1/14
[52] U.S. Cl. ................................. 220/207; 220/89 A; 137/68 R; 285/3; 285/31; 285/368
[58] Field of Search ................... 220/89 R, 89 A, 207; 285/3, 4, 325, 31, 363, 368; 137/68 R

[56] References Cited

U.S. PATENT DOCUMENTS

| 2,194,159 | 3/1940 | Bonyun et al. | 220/89 A |
|---|---|---|---|
| 3,109,553 | 11/1963 | Fike et al. | 220/89 A |
| 3,278,202 | 10/1966 | Smith | 285/368 |
| 3,294,277 | 12/1966 | Wood | 220/89 A |
| 3,524,662 | 8/1970 | Tolman et al. | 285/368 |
| 3,603,617 | 9/1971 | Lochridge | 285/31 |
| 3,721,452 | 3/1973 | Black | 285/4 |
| 3,815,779 | 6/1974 | Ludwig et al. | 220/89 A |
| 3,901,259 | 8/1975 | Banbury | 220/89 A |
| 3,934,602 | 1/1976 | Muddiman et al. | 220/89 A |
| 3,977,709 | 8/1976 | Hatzis | 285/368 |

Primary Examiner—William Price
Assistant Examiner—Joseph M. Moy
Attorney, Agent, or Firm—Laney, Dougherty & Hessin

[57] ABSTRACT

A preassembled pressure relief apparatus adapted to be clamped between a pair of conventional pipe flanges. The apparatus is comprised of a pressure rupturable member supported between a pair of complementary supporting members which include seating surfaces to coact with the annular seating surfaces of the pipe flanges. The supporting members are of a size and shape such that portions thereof extend radially outwardly beyond the boundaries of the annular seating surfaces, of the pipe flanges and means for clamping the supporting members and the pressure rupturable member together in preassembly are attached to such portions of the supporting members.

10 Claims, 12 Drawing Figures

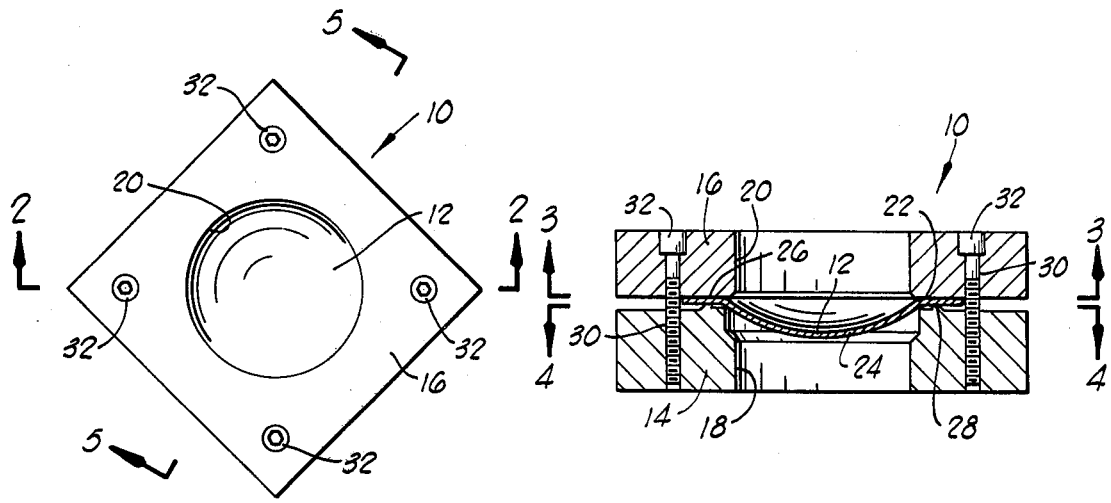
Fig. 1  Fig. 2
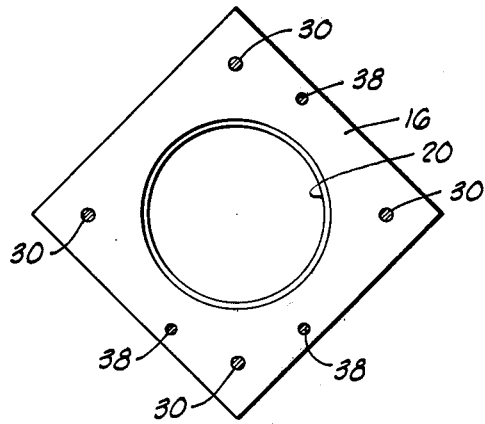 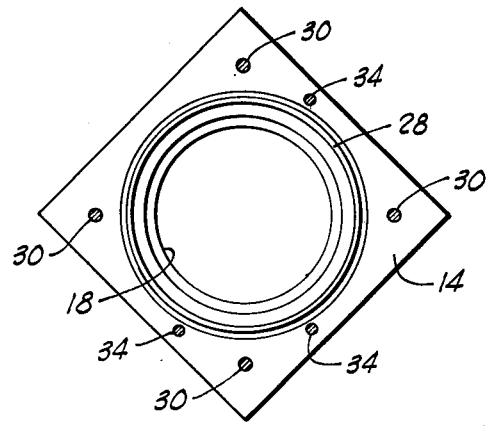
Fig. 3  Fig. 4

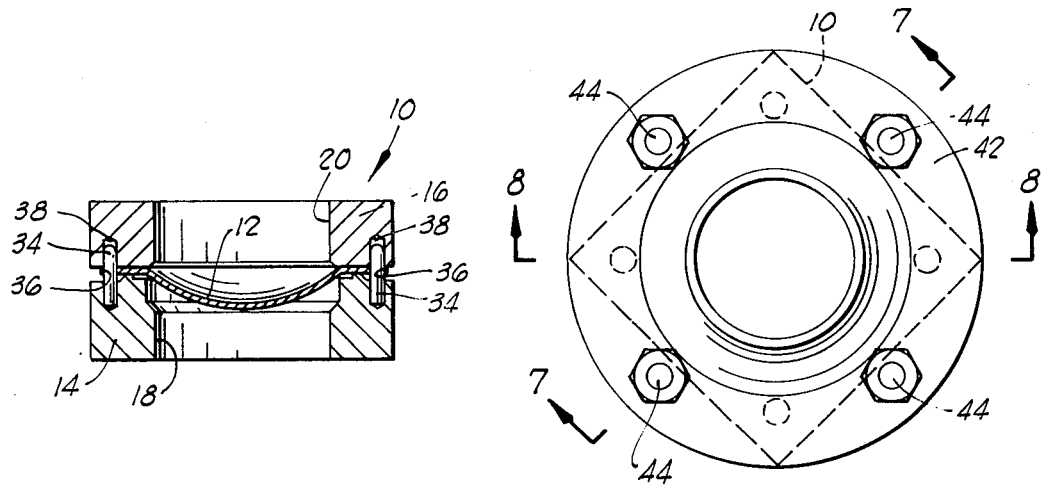
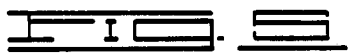
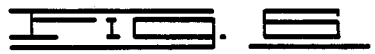
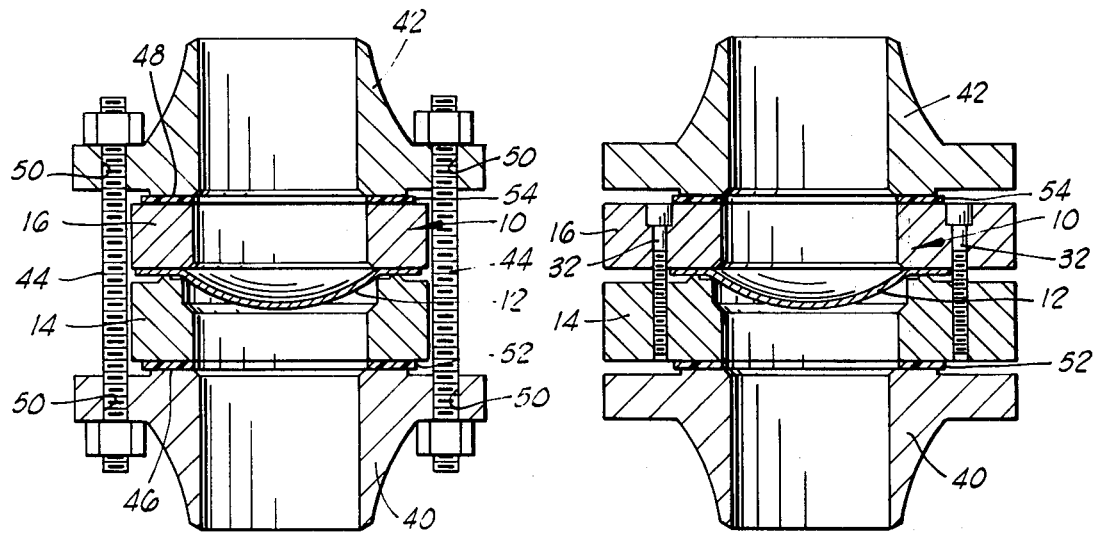
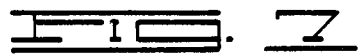
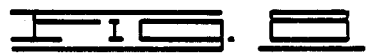

PREASSEMBLED PRESSURE RELIEF APPARATUS

BACKGROUND OF THE INVENTION

1. Field of the Invention

The present invention relates generally to a preassembled pressure relief apparatus, and more particularly, but not by way of limitation, to an improved preassembled pressure relief apparatus of the rupturable type adapted to be clamped between conventional pipe flanges.

2. Description of the Prior Art

A variety of pressure relief apparatus of the rupture disk type have been developed. Generally, such apparatus include a rupture disk supported between a pair of special flanges which are in turn welded or otherwise connected in a pressure system or to a pressure vessel. When the pressure level within the system or vessel exceeds the design rupture pressure of the disk, the disk ruptures so that excess fluid pressure is relieved.

Recently, pressure relief devices of the rupturable type have been developed for clamping between conventional pipe flanges. That is, instead of special flanges which are relatively expensive, a pair of supporting members adapted to be clamped between conventional pipe flanges are provided, between which the rupture disk is held. This type of apparatus has also taken various forms, i.e., in one form the supporting members are of a reduced size such that they fit between the bolt members of the pipe flanges and are held together prior to installation with light side-mounted bars or other means. Other forms of such apparatus include supporting members of full size, i.e., a size corresponding with the diameter of the pipe flanges and include openings through which the bolt members of the pipe flanges are passed. Certain of the prior full diameter apparatus include cap screws disposed therein whereby the supporting members and rupture disk are preassembled and clamped together prior to installation between the pipe flanges.

In use of the prior apparatus of reduced diameter which fits between the bolt members of the pipe flanges, problems have been encountered due to misalignment of the rupture disk within the supporting members, misalignment of the supporting members with each other and the application of too much, too little or imbalanced load on the rupture disk resulting in improper operation of the rupture disk, i.e., raising or lowering the design rupture pressure of the disk. Also, such apparatus cannot be removed and inspected and then placed back in service without running the risk of impairing the operation of the rupture disk in that upon clamping the disk a second time between the supporting members, distortion of the disk may result, thereby raising or lowering the rupture pressure thereof. While the prior preassembled full diameter apparatus have generally overcome the problems associated with misalignment, etc., mentioned above, in order to remove the apparatus for inspection, all of the bolt members of the pipe flanges must be removed.

Attempts to utilize preassembled apparatus having circular supporting members of reduced diameter whereby the apparatus fits between the bolt members of the pipe flanges have been largely unsuccessful, particularly in low pressure applications, due to the requirement that the means for clamping the supporting members and rupture member together in preassembly, i.e., cap screws or the like, must be positioned in the area forming the seating surfaces of the supporting members which coact with the seating surfaces of the pipe flanges thereby interfering with the ability of the apparatus to seal against the seating surfaces of the pipe flanges.

By the present invention, an improved preassembled pressure relief apparatus adapted to be clamped between conventional pipe flanges is provided which avoids the problems associated with misalignment, etc., mentioned above, and which can be readily removed for inspection and reinstalled without the necessity of removing all of the bolt members of the pipe flanges. Further, a single apparatus of the present invention can be utilized with conventional pipe flanges of various pressure ratings.

SUMMARY OF THE INVENTION

The present invention relates to a preassembled pressure relief apparatus adapted to be clamped between a pair of conventional pipe flanges having annular seating surfaces and a plurality of bolt members disposed through openings positioned in spaced relationship about the annular seating surfaces. The apparatus comprises a pressure rupturable member and a pair of complementary supporting members adapted to fit between the pipe flanges and the bolt members thereof. The supporting members include central bores disposed therein for providing a flow passageway between the pipe flanges, and sealingly support the pressure rupturable member across the flow passageway. Annular seating surfaces are provided on the supporting members to coact with the annular seating surfaces of the pipe flanges, and the supporting members are of a size and shape such that portions thereof extend radially outwardly beyond the boundaries of the annular seating surfaces. Means for clamping the supporting members and the pressure rupturable member together are attached to the portions of the supporting members which extend beyond the boundaries of the seating surfaces of the pipe flanges.

It is, therefore, a general object of the present invention to provide an improved preassembled pressure relief apparatus of the type installed between conventional pipe flanges.

A further object of the present invention is the provision of an improved preassembled pressure relief apparatus adapted to be clamped between conventional pipe flanges which avoids problems associated with misalignment, underbolting, etc., upon installation of the apparatus between the pipe flanges.

Another object of the present invention is the provision of an improved preassembled pressure relief apparatus which can be quickly and easily removed for inspection and reinstalled without impairing the operation of the apparatus and without the necessity of removing all of the bolt members from the pipe flanges.

Yet a further object of the present invention is the provision of an improved preassembled pressure relief apparatus which can be utilized with pipe flanges of various pressure ratings without the necessity of using different sizes of supporting members.

Other and further objects, features and advantages of the present invention will be apparent from the following description of preferred embodiments, given for the purpose of disclosure and taken in conjunction with the accompanying drawings.

DESCRIPTION OF THE DRAWINGS

FIG. 1 is a top view of a preferred preassembled pressure relief apparatus of the present invention.

FIG. 2 is a cross-sectional view of the apparatus of FIG. 1 taken along line 2—2 thereof.

FIG. 3 is a view of the apparatus of FIG. 2 taken along line 3—3 thereof.

FIG. 4 is a view of the apparatus of FIG. 2 taken along line 4—4 thereof.

FIG. 5 is a cross-sectional view of the apparatus of FIG. 1 taken along line 5—5 thereof.

FIG. 6 is a top view of a pair of conventional pipe flanges having the preassembled pressure relief apparatus of FIGS. 1 through 5 installed therebetween.

FIG. 7 is a cross-sectional view of the apparatus of FIG. 6 taken along line 7—7 thereof.

FIG. 8 is a cross-sectional view of the apparatus of FIG. 6 taken along line 8—8 thereof.

DESCRIPTION OF PREFERRED EMBODIMENTS

Figures 9, 10:
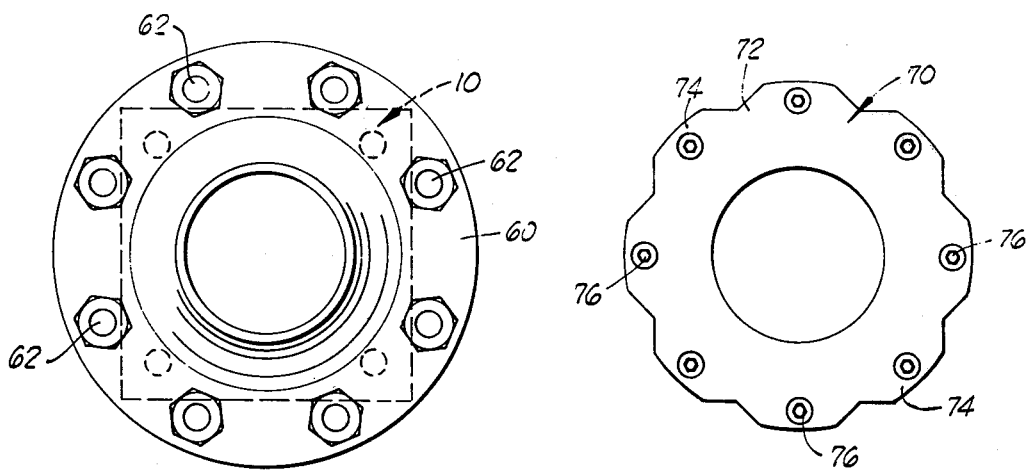
FIG. 9 is a top view of a pair of alternate conventional pipe flanges having the preassembled pressure relief apparatus of FIGS. 1 through 5 installed therebetween.
FIG. 10 is a top view of an alternative form of preassembled pressure relief apparatus of the present invention.

Referring now to the drawings, and specifically to FIGS. 1 through 5 thereof, the apparatus of the present invention is illustrated and generally designated by the numeral 10. The apparatus 10 basically comprises a pressure rupturable member 12 supported between inlet and outlet supporting members 14 and 16 respectively. In the embodiment illustrated in the drawings, the pressure rupturable member 12 is a reverse buckling rupture disk. However, as will be understood by those skilled in the art, the present invention is not limited to a pressure rupturable member of the reverse buckling type, and any design or configuration of pressure rupturable member may be utilized. The supporting members 14 and 16 are formed in the shape of right parallelepipeds, the top and bottom surfaces of which are of square shape. Each of the supporting members 14 and 16 includes a centrally disposed circular bore 18 and 20, respectively, which form a flow passageway through the supporting members across which the rupture disk 12 is positioned. In the form disclosed, the reverse buckling rupture disk 12 includes an annular flat flange portion 22 and a concave-convex central portion 24. The outlet supporting member 16 is provided with an annular flat portion 26 to coact with and support the annular flat flange portion 22 of the rupture disk 12, and the inlet supporting member 14 includes a flat annulet 28 for coacting with and supporting the other side of the flat annular flange portion 22 of the rupture disk 12. Located in the corner portions of the square supporting members 14 and 16 are complementary openings 30 adapted to receive cap screws 32. The rupture disk 12 and the inlet and outlet supporting members 14 and 16 are preassembled and clamped together as shown in FIG. 2 by means of the cap screws 32 under a predetermined cap screw torque and consequent preload on the rupture disk so that the rupture disk operates in a desired manner, i.e., ruptures when a predetermined fluid pressure is exerted on the disk by way of the inlet supporting member 14.

As shown best in FIGS. 3 through 5, the inlet supporting member 14 includes three upstanding posts 34 positioned asymmetrically on the annular flat portion thereof against which the annular flat flange 22 of the rupture disk 12 is positioned. The rupture disk 12 is provided with apertures 36 through which the posts 34 fit so that the rupture disk 12 cannot be installed in an upside down position and so that when the rupture disk 12 is fitted onto the posts 34 it is centered with respect to the inlet supporting member 14. The outlet supporting member 16 includes three bores 38 which are complementary to the posts 34. That is, the bores 38 are positioned with respect to the posts 34 such that when the outlet supporting member 16 is installed against the inlet supporting member 14 with the posts 34 inserted in the bores 38, the inlet and outlet supporting members 14 and 16 are held in proper alignment with respect to each other and with respect to the rupture disk 12.

The posts 34, of course, may vary in number and shape and may be installed in the outlet supporting member 16 with the bores 38 being included in the inlet supporting member 14, or alternatively, one or more of the posts 34 may be installed on one of the supporting members with the remaining posts installed in the other of the members.

As mentioned above, the pressure rupturable member 12 can take a variety of forms and shapes. However, the apparatus of the present invention is particularly suitable for use with reverse buckling scored rupture disks of the type described and claimed in U.S. Pat. No. 3,484,817 assigned to the assignee of this present invention.

Referring now to FIGS. 6 through 8, the preassembled pressure relief apparatus 10 is illustrated installed between a pair of conventional pipe flanges 40 and 42. Such flanges in the smaller sizes, i.e., 1 inch, 1½ inch, 2 inch and 3 inch 150 pound ASA rated flanges and 1 inch and 1½ inch 300 pound and 600 pound ASA rated flanges include four studs or bolt members 44. As will be understood, when the apparatus 10 is inserted between the flanges 40 and 42, extra-long studs 44 are utilized for clamping the flanges 40 and 42 and the apparatus 10 together. The flanges 40 and 42 include annular raised face seating surfaces 46 and 48, respectively, and the studs 44 are disposed through complementary openings 50 positioned in the flanges 40 and 42 in spaced relationship about the annular seating surfaces 46 and 48 thereof. Conventional annular gaskets 52 and 54, respectively, are disposed between the annular seating surfaces of the flanges 40 and 42 and the complementary seating surfaces of the apparatus 10, i.e., the top surface of the supporting member 16 and the lower surface of the supporting member 14.

As mentioned above, the apparatus 10 is of a size such that it fits between the studs 44 of the various sizes of ASA flanges mentioned above. Further, because of the square shape of the supporting members 14 and 16, the corner portions thereof extend radially outwardly beyond the annular seating surfaces 46 and 48 of the pipe flanges 42 and the complementary annular seating surfaces of the supporting members 14 and 16. The openings 30 formed in the supporting members 14 and 16 and the cap screws 32 clamping the supporting members and rupture disk 12 together are positioned in the corner portions of the supporting members 14 and 16 which extend beyond the outer boundaries of the seating surfaces 46 and 48. Thus, the openings 30 and cap screws 32 do not interfere with the seal between the seating surfaces and the gaskets 52 and 54.

Because of the square shape of the supporting members 14 and 16 of the apparatus 10, when it is desired to remove the apparatus 10 from between the pipe flanges 40 and 42 for inspection or other reason, only a portion of the studs 44 need be removed. That is, in the case of flanges having four studs 44 as illustrated in FIGS. 6 through 8, it is only necessary to loosen the studs and remove one from the flanges 40 and 42 in order to remove the apparatus 10. As will be understood, the diameters of the bolt circles of flanges of different pressure ratings vary. For example, a 1½ inch 150 pound ASA, raised face flange has a bolt circle of one diameter while a 1½ inch 600 pound ASA raised face flange has a bolt circle of slightly larger diameter. However, the preassembled apparatus 10 can be utilized with and fits between and within the bolt circles of 150 pound ASA raised face flanges as well as 300 pound and 600 pound raised face flanges of corresponding size in that slight misalignment between the flanges and the preassembled apparatus 10 is of little consequence. That is, the same preassembled apparatus 10 can be installed within 1 inch 150 pound ASA flanges, 1 inch 300 pound ASA flanges and 1 inch 600 pound ASA flanges. In a like manner, the preassembled apparatus 10 designed to fit between 1½ inch 150 pound ASA flanges also fits and can be utilized with 1½ inch 300 pound and 600 pound ASA flanges.

Referring now to FIG. 9, the apparatus 10 is illustrated installed between a pair of conventional raised face flanges 60 having eight bolt members 62. Flanges having eight bolt members include 2 inch 300 pound and 600 pound ASA, 3 inch 300 pound and 600 pound ASA and 4 inch 150 pound and 300 pound ASA. The same apparatus 10 designed to be installed between four bolt member flanges in the manner illustrated in FIG. 6 can also be utilized with and installed between some eight bolt member flanges as illustrated in FIG. 9. For example, the apparatus 10 which fits a pair of 2 inch 150 pound ASA raised face flanges in the manner shown in FIG. 6, fits a pair of 2 inch 300 pound or 2 inch 600 pound ASA raised face flanges in the manner shown in FIG. 9.

Referring now to FIG. 10, an alternate form of the preassembled pressure relief apparatus of the present invention is illustrated and generally designated by the numeral 70. The apparatus 70 is similar to the apparatus 10 described above except for the shape of the supporting members 72. That is, the apparatus 70 is designed for use with larger sizes of conventional pipe flanges having eight or twelve bolt members. In the specific form of the apparatus 70, the supporting members 72 are formed in the shape of polyhedrons with the surfaces thereof positioned transversely to the axes of the pipe flanges being of flat star-shape whereby the star points 74 extend beyond the boundaries of the seating surfaces of the flanges. The star points 74 are rounded off at their extremities so that the apparatus 70 fits within the bolt members of twelve bolt flanges as will be described further below. Complementary openings and cap screws 76 are provided in the portions 74 of the supporting members extending beyond the boundaries of the seating surfaces of the flanges.

Figures 11, 12:
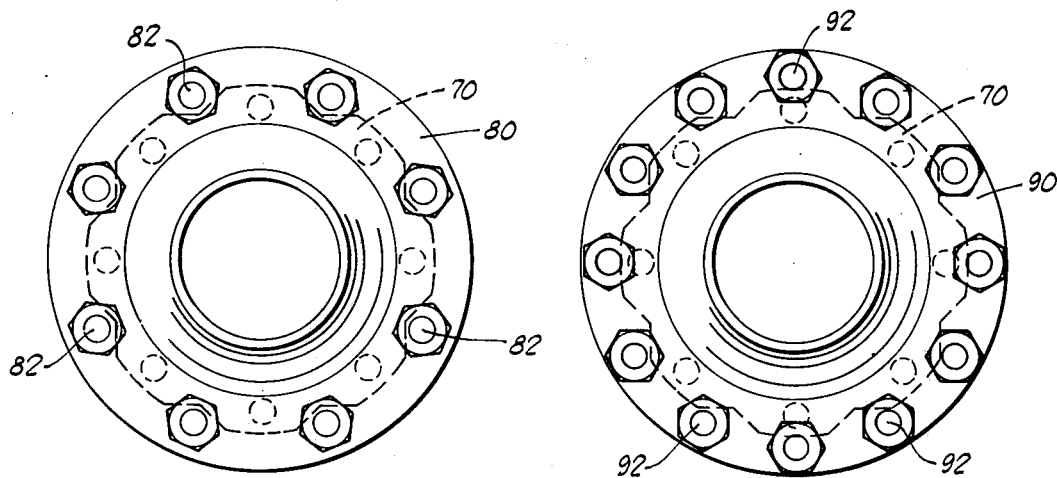
FIG. 11 is a top view of a pair of conventional pipe flanges having the preassembled pressure relief apparatus of FIG. 10 installed therebetween.
FIG. 12 is a top view of a pair of alternate conventional pipe flanges having the preassembled pressure relief apparatus of FIG. 10 installed therebetween.

Referring to FIG. 11, the preassembled apparatus 70 is illustrated installed between a pair of flanges 80 having eight bolt members 82, e.g., a pair of 6 inch 150 pound ASA raised face flanges. As shown in FIG. 12, the same apparatus 70 can be installed between a pair of flanges 90 having twelve bolt members 92, e.g., a pair of 6 inch 300 pound ASA raised face flanges. Like the apparatus 10, the apparatus 70 can be quickly and easily removed from between the pipe flanges 80 and 90 by the loosening of the bolt members and removal of only a portion thereof.

As will now be apparent, the supporting members of the present invention can take a variety of other shapes which provide portions extending beyond the boundaries of the annular seating surfaces for containing the cap screws or other means for clamping the supporting members and rupture member together.

ASSEMBLY AND OPERATION

In the assembly of the apparatus 10, the rupture disk 12 is fitted over the guide posts 34 into a position adjacent the inlet supporting member 14. The outlet supporting member 16 is then fitted onto the guide posts 34 adjacent the rupture member 12, and the cap screws 32 are tightened. The assembly of the apparatus 10 is accomplished at the factory or in a maintenance shop by a skilled mechanic, and the cap screws 32 are tightened under the proper torque so that a predetermined equally distributed preload is applied to the rupture disk 12. This procedure insures that the apparatus 10 is assembled correctly and that damage due to transit, handling and exposure to the elements of the atmosphere is minimized.

At the location where the apparatus 10 is to be utilized, the apparatus 10 is inserted along with conventional gaskets 46 and 48 between the conventional pipe flanges 40 and 42. The studs or bolt members 44 are then installed through the openings 50 in the flanges 40 and 42 and tightened so that the apparatus 10 is clamped between the flanges 40 and 42 and the annular seating surfaces 46 and 48 of the flanges seal against the gaskets 52 and 54 and the annular seating surfaces of the apparatus 10. Because the apparatus 10 is preassembled and the proper torque applied to the cap screws 32, slight over or under torquing of the bolt members 44, or uneven tightening of the bolt members 44, do not affect the proper operation of the rupture disk 12.

When it is desired or necessary to inspect the apparatus 10 to insure that the rupture disk 12 has not been damaged, corroded or otherwise impaired, the bolt members 44 are loosened, and as stated above, only a portion of such bolt members need be removed in order to remove the apparatus 10.

Thus, the present invention is well adapted to carry out the objects and attain the ends and advantages mentioned as well as those inherent therein. While presently preferred embodiments of the invention are given for the purpose of disclosure, numerous changes in the details of construction as well as in the arrangement and shape of the various parts can be made which will readily suggest themselves to those skilled in the art and which are encompassed within the spirit and scope of the appended claims.

What is claimed is:

1. A preassembled pressure relief apparatus adapted to be clamped between a pair of conventional pipe flanges, said pipe flanges having raised face annular seating surfaces and a plurality of bolt members disposed through openings positioned in spaced relationship about said annular seating surfaces which comprises:

a pressure rupturable member;

a pair of complementary supporting members adapted to fit between the pipe flanges and the bolt members thereof having central bores disposed therein for providing a flow passageway between the pipe flanges and for sealingly supporting said pressure rupturable member therebetween across said passageway, having annular seating surfaces to coact with the raised face annular seating surfaces of the pipe flanges and being of a size and shape such that portions of said supporting members extend radially outwardly beyond the boundaries of the raised face annular seating surfaces of the pipe flanges, said portions including complementary openings positioned therein; and bolt members disposed within said complementary openings in said portions of said supporting members extending radially outwardly beyond the boundaries of the raised face seating surfaces of the pipe flanges for clamping said supporting members and said rupture disk together in preassembly.

2. The preassembled pressure relief apparatus of claim 1 wherein said supporting members are formed in the shape of right parallelepipeds with the surfaces thereof positioned transversely to the axes of the pipe flanges being of flat square shape and the portions thereof extending beyond the boundaries of the raised face seating surfaces of the pipe flanges being the corners thereof.

3. The preassembled pressure relief apparatus of claim 1 wherein said supporting members are formed in the shape of polyhedrons with the surfaces thereof positioned transversely to the axes of the pipe flanges being of flat star-shape and the portions thereof extending beyond the boundaries of the raised face seating surfaces of the pipe flanges being the star-points thereof.

4. The preassembled pressure relief apparatus of claim 1 which is further characterized to include:

said pressure rupturable member having an annular flat flange portion;

each of said supporting members having annular flat portions to coact with and support the annular flat flange portion of said rupturable member; and means attached to said supporting members for aligning said supporting members, centering said rupturable member therebetween and preventing said rupturable member from being installed upside down between said supporting members.

5. The preassembled pressure relief apparatus of claim 4 wherein said means attached to said supporting members for aligning said supporting members, centering said rupturable member therebetween and preventing said rupturable member from being installed upside down between said supporting members comprises:

the annular flat portion of one of said supporting members including a plurality of upstanding posts positioned thereon;

the opposite annular portion of the other of said supporting members including a plurality of bores for receiving and engaging said upstanding posts when said supporting members are clamped together thereby aligning said supporting members; and said pressure rupturable member including a plurality of apertures in the annular flange portion thereof positioned with respect to said upstanding posts so that when said rupturable member is positioned between said supporting members with said upstanding posts fitted through said apertures, said rupturable member is centered therebetween and positioned right side up.

6. The preassembled pressure relief apparatus of claim 5 wherein said pressure rupturable member is a circular reverse buckling rupture disk having a concave-convex portion attached to said annular flange portion.

7. A preassembled pressure relief apparatus adapted to be clamped between a pair of conventional pipe flanges, said pipe flanges having raised face annular seating surfaces and a plurality of bolt members disposed through openings positioned in spaced relationship about said annular seating surfaces which comprises:

a reverse buckling rupture disk;

a pair of complementary supporting members adapted to fit between the pipe flanges and the bolt members thereof having central circular bores disposed therein for providing a flow passageway between the pipe flanges and for sealingly supporting said rupture disk therebetween across said passageway, having annular seating surfaces to coact with the raised face annular seating surfaces of the pipe flanges and being formed in the shape of right parallelepipeds with the surfaces thereof positioned transversely to the axes of the pipe flanges being of flat square shape whereby the corner portions of said supporting members extend beyond the boundaries of the raised face seating surfaces of the pipe flanges, each of said corner portions including complementary openings positioned therein; and bolt members disposed within said complementary openings in said corner portions of said supporting members for clamping said supporting members and said rupture disk together in preassembly.

8. The preassembled pressure relief apparatus of claim 7 which is further characterized to include:

said rupture disk having an annular flat flange portion;

each of said supporting members having annular flat portions to coact with and support the annular flat flange portion of said rupture disk; and means attached to said supporting members for aligning said supporting members, centering said rupture disk therebetween and preventing said rupture disk from being installed upside down between said supporting member.

9. The preassembled pressure relief apparatus of claim 8 wherein said means attached to said supporting members for aligning said supporting members, centering said rupture disk therebetween and preventing said rupture disk from being installed upside down between said supporting member comprises:

the annular flat portion of one of said supporting members including a plurality of upstanding posts positioned thereon;

the opposite annular portion of the other of said supporting members including a plurality of bores for receiving and engaging said upstanding posts when said supporting members are clamped together thereby aligning said supporting members; and said rupture disk including a plurality of apertures in the annular flange portion thereof positioned with respect to the said upstanding posts so that when said rupture disk is positioned between said supporting members with said upstanding posts fitted through said apertures, said rupture disk is centered therebetween and positioned right side up.

10. The preassembled pressure relief apparatus of claim 9 wherein said rupture disk is a scored reverse buckling rupture disk.

* * * * *